Jan. 12, 1960     H. L. BUNGART     2,920,502

ADJUSTABLE LOST MOTION DEVICE

Filed April 17, 1958

INVENTOR
HENRY L. BUNGART
BY
ATTORNEY

United States Patent Office 2,920,502
Patented Jan. 12, 1960

2,920,502

ADJUSTABLE LOST MOTION DEVICE

Henry L. Bungart, Glen Cove, N.Y., assignor to Sperry Rand Corporation, Great Neck, N.Y., a corporation of Delaware Application April 17, 1958, Serial No. 729,136

6 Claims. (Cl. 74—665)

The present invention relates to lost motion devices. It particularly relates to devices capable of introducing a precise and adjustable amount of lost motion into mechanical transmission systems. The lost motion device of the present invention is particularly useful in equalizing the amount of lost motion in plural transmission paths for purposes of synchronization.

Previous attempts to solve the problem of synchronizing the outputs of plural transmission paths by equalizing the lost motion therein have usually been directed toward elimination of the lost motion. This required either a spring-type anti-backlash device, an unduly complex servo system or extreme precision in the design of the interengaging elements of the transmission system. The spring-type anti-backlash devices are difficult to set precisely and tend to wear out rapidly. In addition, the spring establishes a lower limit on the size of the anti-backlash gear as well as having a tendency to make the output therefrom oscillatory. The design and manufacture of extremely precise interengaging elements of a transmission system is difficult and expensive.

The prior art attempts at introducing lost motion into transmission systems have been directed to purposes other than synchronization. Generally, they result in devices which add a fixed amount of lost motion and are not adjustable. Further, they usually impair the structural integrity of the transmission system and are unduly cumbersome.

One of the objects of the present invention is to provide a lost motion device capable of accurately adjusting the lost motion of one transmission path with respect to the lost motion of another transmission path to synchronize the outputs of the transmission paths.

Another object of the present invention is to provide a simple means for precisely adjusting the amount of lost motion in a mechanical transmission system.

It is a further object of the present invention to provide a lost motion device that is structurally rugged and compact and capable of being readily adjusted to introduce a precise amount of lost motion.

To accomplish the above objects, the lost motion device of the present invention has adjustable elements that cooperate with a housing for precisely varying the amount of lost motion therein. For example, in a transmission system where a drive member simultaneously drives two driven members by means of separate gear trains, there is usually a different amount of lost motion in each gear train resulting in greater or lesser movement of one driven member with respect to the other. By adding a precise amount of lost motion by means of the lost motion device of the present invention into the gear train having the lesser amount of lost motion, the system may be compensated whereby each gear train will have an equal amount of lost motion in order that the driven members will be synchronized with each other notwithstanding the presence of lost motion in the gear trains.

The present invention will be described with reference to the accompanying drawing, wherein:

Fig. 1 schematically illustrates the lost motion device of the present invention in a typical embodiment;

Figure 1:
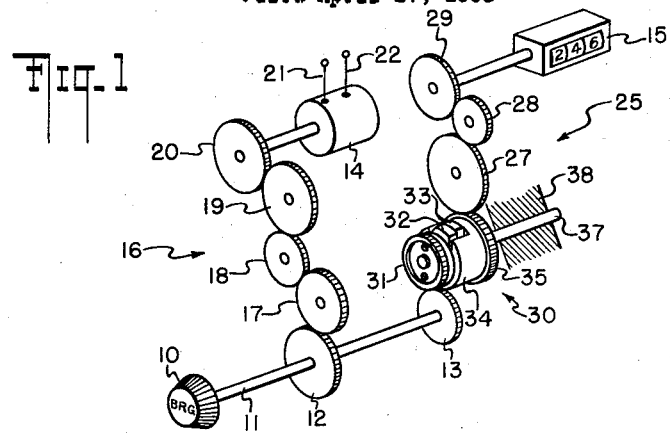

Referring to Fig. 1, the lost motion device of the present invention will be described for the purposes of example in an aircraft navigation instrument which may be of the type shown in U.S. Patent No. 2,732,550, entitled "Display Instrument for Radio Navigation Systems," issued to E. F. Reedy on January 24, 1956, and assigned to the same assignee as the present invention. In Fig. 1, a drive member consisting of a bearing set knob 10 connected by shaft 11 to driving gears 12 and 13 is shown operably coupled to simultaneously drive two driven members; i.e., synchro 14 and a drum-type counter 15. Synchro 14 is driven in accordance with the movement of bearing set knob 10 through a transmission means such as a gear train 16 which consists of driving gear 12 that meshes with gears 17, 18 and 19 to drive gear 20.

Attached to gear 20 by a shaft is a rotor (not shown) of synchro 14 which is rotated to provide an electrical output therefrom by means of electrical leads 21 and 22 in accordance with the rotation of knob 10. As shown, the electrical output from synchro 14 is thus indicative of the selected bearing or heading as set in by the pilot.

Drum-type counter 15 is also driven in accordance with the movement of bearing set knob 10 through a transmission means such as gear train 25. Gear train 25 consists of driving gear 13 that meshes with input gear 31 of lost motion device 30, and also includes output gear 35 of lost motion device 30 that meshes with gears 27 and 28 to drive gear 29. Gear 29 is coupled by a shaft to drive drum-type counter 15 in accordance with the rotation of knob 10. The bearing selected by the bearing selector knob is thus visually indicated to the pilot by means of the digits appearing on counter 15 as explained in detail in the aforementioned Patent No. 2,732,550.

It will be apparent that if there is greater lost motion in one of the gear trains, for example 16, with respect to the other, for example 25, then the visual indication to the pilot appearing on the counter 15 will not be synchronized with the electrical output from the synchro 14. Thus, for example, in the operation of the instrument of Fig. 1, if the pilot rotates knob 10 to a desired bearing of 90° and there is no lost motion in gear train 25, the counter will indicate 90° as the selected bearing. However, if there are 2° of lost motion in the gear train 16, the electrical output from the synchro 14 will be equivalent to either 88° or 92° instead of the desired 90° depending upon the direction of rotation of knob 10.

To compensate for the 2° of lost motion in gear train 16, lost motion device 30 is inserted in gear train 25 to provide an equivalent 2° of lost motion. By adjusting device 30, in a manner to be explained, to provide 2° of lost motion, each of the gear trains 16 and 25 will have an equal amount of lost motion; i.e., 2°. Then when knob 10 is rotated, both the rotation of the digits of counter 15 and the rotation of the rotor of synchro 14 will be synchronized to provide an accurate visual indication and electrical output, respectively.

Figures 2, 3:
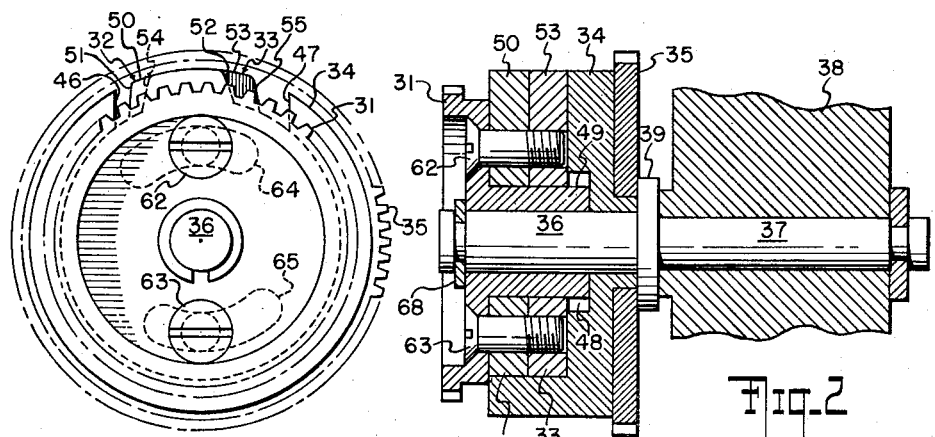
Fig. 2 is a sectional view of the lost motion device of Fig. 1.
Fig. 3 is a front view of the lost motion device of Fig. 1.
Figure 4:
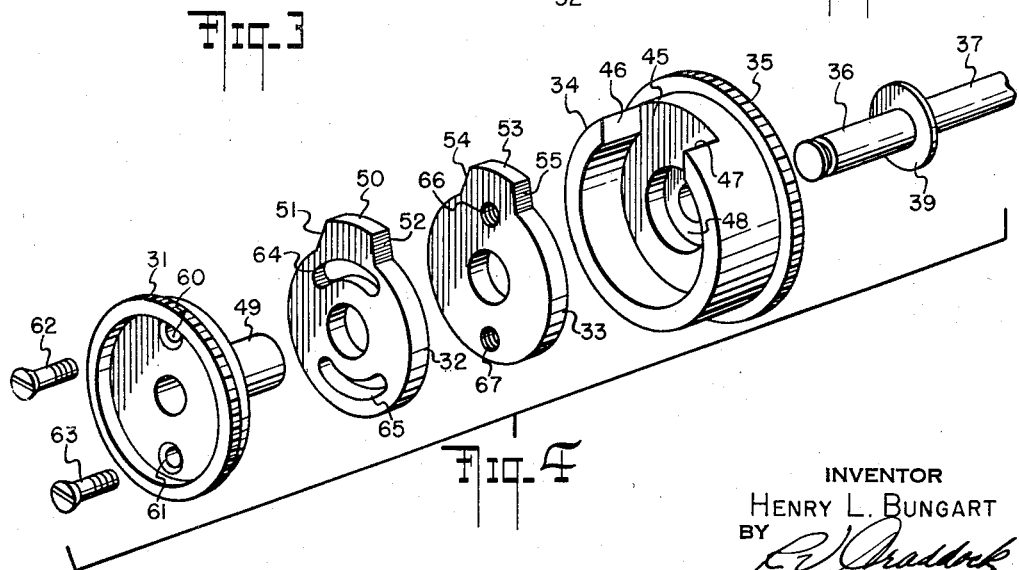
Fig. 4 is an exploded view of the lost motion device of Fig. 1.

Referring now to Figs. 2, 3 and 4, the lost motion device 30 consists of an input gear 31, a slotted disc 32, a disc with threaded holes 33, a housing 34 that has an output gear 35 integral therewith, and a shaft 36 for mounting input gear 31 and housing 34 thereon. Elements 31, 32, 33, 34 and 35 are coaxially mounted with respect to the longitudinal axis 37 of shaft 36. One end of shaft 36 is fixedly mounted, for example, to chassis 38. The other end of shaft 36 supports elements 31, 32, 33, 34 and 35 with the output gear 35 abutting against shoulder 39 of shaft 36.

The housing 34 is coaxially mounted for rotation about axis 37 on shaft 36 by means of an axial bore in housing 34. One end of housing 34 has a collar for coaxially mounting output gear 35 thereon by means of a press fit so that housing 34 and output gear 35 rotate about axis 37 as a unit. The other end of housing 34 has a hollow cylindrical portion with an arcuate opening 45 therein having edges 46 and 47 that cooperate, in a manner to be described, with discs 32 and 33. Housing 34 may also have a centrally disposed counterbore 48 therein for receiving a portion of the input gear 31, in a manner to be described.

Input gear 31 is also coaxially mounted for rotation about axis 37 on shaft 36 by means of an axial bore in gear 31. One end of input gear 31 has a cylindrical support portion 49 upon which discs 32 and 33 are coaxially mounted for rotation about axis 37 by means of centrally disposed apertures in each of the discs. Disc 32 has an arcuate projection 50 thereon having edge portions 51 and 52 that are disposed to cooperate with edge portions 45 and 47, respectively, of housing 34. Similarly, disc 33 has a projection 53 with edges 54 and 55 disposed to cooperate with edges 46 and 47, respectively, of housing 34. Input gear 31 has apertures 60 and 61 therein for receiving set screws 62 and 63, respectively. Set screws 62 and 63 project through cooperatively disposed arcuate slots 64 and 65, respectively, in disc 32 to become threaded in threaded holes 66 and 67, respectively, in disc 33 in order that input gear 31 and discs 32 and 33 rotate as an integral unit. The extremity of support portion 49 may extend into counterbore 48.

The elements 31 and 34 may be prevented from slipping off shaft 36 by the pressure from driving gear 12 which drives input gear 31, or a spring clip 68 may be used to hold the aforementioned elements together.

The lost motion device 30 may be calibrated for any particular system, such as the system of Fig. 1, by loosening the set screws 62 and 63 from threaded holes 66 and 67, respectively, and rotating knob 10 until there is no lost motion between the synchro 14 and the counter 15, as would be the case, for example, after a few rotations of the knob 10 in one direction. Disc 32, for example, is then rotated relative to disc 33 a small amount so the projection 50 occupies a portion of the arcuate free space between the edge 51 of disc 32 and the edge 46 of housing 34 and the set screws 62 and 63 are then tightened. The rotation of knob 10 is then reversed and movements of the synchro 14 with respect to the counter 15 are noted, for example, by viewing scribe lines on the driven members, or, as in this case, by measuring the electrical output of the synchro and comparing it with the counter indication.

If the outputs are not synchronized, the set screws 62 and 63 are loosened and the position of disc 32 with respect to disc 33 is again adjusted. This trial and error process of increasing and decreasing the lost motion space continues until the outputs of the synchro 14 and the counter 15 are synchronized, at which time the set screws 62 and 63 are tightened. When the aforementioned outputs are synchronized, the remaining arcuate space between the edge 51 of disc 32 and the edge 46 of housing 34 will be sufficient to compensate for the additional lost motion of gear train 16 with respect to gear train 25 for one direction of rotation of knob 10.

By a similar operation in the opposite direction, the arcuate space between edge 55 of disc 33 and edge 47 of housing 34 will be sufficient to compensate for the additional lost motion of gear train 16 with respect to gear train 25 for the other direction of rotation of knob 10. After the set screws 62 and 63 are firmly fastened, the input gear 31 and discs 32 and 33 move integrally through the arcuate space relative to housing 34. Arcuate opening 45 and projections 50 and 53 are designed to cooperatively provide the maximum range of lost motion required for the particular application, for example, 0° to 30°.

After the lost motion device 30 has been calibrated for a particular system, such as the system of Fig. 1, the operation will be as follows. Rotation of knob 10 in a particular direction will rotate driving gears 12 and 13 accordingly. Depending upon the amount of lost motion in gear train 16, the rotor (not shown) of synchro 14 will be driven by driving gear 12 via gear train 16 to a position determined by the amount of rotation of knob 10. The electrical output of synchro 14 will thus be proportional to the amount of rotation of knob 10 and the amount of lost motion in gear train 16.

Rotation of knob 10 also causes drive gear 13 to rotate input gear 31 of lost motion device 30. Input gear 31 and discs 32 and 33 will rotate freely, without moving output gear 35, through the lost motion space. Depending upon the direction of rotation, when one of the projections 50 or 53 has traveled through the lost motion space, one of the edges thereof will contact one of the edges 46 or 47 of housing 34 to thereby drive output gear 35. The counter 15 will then be driven in accordance with the rotation of output gear 35 through gear train 25 to a position determined by the amount of lost motion introduced by device 30, the amount of lost motion in gear train 25 and the amount of rotation of knob 10. In this manner, the total lost motion of each of the gear trains 16 and 25 may be made equal in order that the outputs from synchro 14 and counter 15 may be synchronized. In a similar manner, rotation of the knob 10 in the opposite direction will introduce a predetermined amount of lost motion in gear train 25 depending upon the lost motion space between an edge of the other projection of device 30 and the other edge of housing 34.

It should be noted that the friction in the counter 15 must be sufficient to prevent undesirable rotation of output gear 35 of device 30 through an angle equal to the lost motion space. Furthermore, the frictional resistance of the discs 32 and 33 acting on housing 34 and that between input gear 31 and shaft 36 should be negligible and not cause housing 34 and thus counter 15 to be dragged around with the discs 32 and 33 when they move through the lost motion space.

The invention has been described in the embodiment of Fig. 1 for purposes of example and simplicity only. The invention is also applicable in a single gear train for introducing an adjustable amount of lost motion between, for example, a driving member and a driven member. Further, the present invention would be equally adaptable for introducing a precise and adjustable amount of lost motion in other types of mechanical transmission systems, such as, for example, chain and sprocket systems, belt and pulley systems, as well as others.

While the invention has been described in its preferred embodiment, it is to be understood that the words which have been used are words of description rather than limitation and that changes within the purview of the appended claims may be made without departing

What is claimed is:

1. An adjustable lost motion device having a longitudinal axis comprising an input element adapted to rotate coaxially about said axis, a first disc disposed to rotate coaxially about said axis with said input element, said first disc having a first projection thereon, a second disc disposed to rotate coaxially about said axis with said input element, said second disc having a second projection thereon, an output element having a housing integral therewith disposed to rotate coaxially about said axis, said housing having an opening therein adapted to cooperate with the projections on said discs for providing lost motion between said input element and said output element, and means for adjusting the relative angular positions of said projections with respect to each other whereby the amount of lost motion between the input element and the output element may be varied.

2. In a transmission system having a determinable amount of lost motion between a drive member and a driven member, a lost motion device having a longitudinal axis comprising an input element driven by said drive member to rotate about said axis, first and second discs disposed to rotate coaxially with said input element, each of said discs having a projection thereon, an output element having a housing integral therewith disposed for coaxial rotation about said axis, said housing having an opening therein adapted to cooperate with the projections of said discs for providing lost motion therebetween, and means for adjusting the projections with respect to each other whereby the amount of the lost motion in said transmission system may be accurately adjusted.

3. Means for driving a plurality of driven members into positional agreement with respect to each other when driven by a common drive member comprising, means adapted to connect said drive member to drive each of said driven members through a separate transmission path wherein each transmission path has a determinable amount of lost motion, and means connected between at least one of said driven members and said drive member for adjustably varying the amount of lost motion therebetween whereby the driven members may be synchronized with respect to each other.

4. In a transmission system, a drive member, a first driven member, a second driven member, a first mechanical transmission means operably connecting said drive member and said first driven member, a second mechanical transmission means operably connecting said drive member and said second driven member, and adjustable lost motion means connected between the drive member and the driven member in the transmission means having the lesser amount of lost motion whereby the lost motion of said first and second transmission means may be made equal.

5. In a transmission system, a drive member, a first driven member, a second driven member, a first mechanical transmission means operably connecting said drive member and said first driven member, a second mechanical transmission means operably connecting said drive member and said second driven member, and adjustable lost motion means connected between the drive member and the driven member in at least one of said transmission means for adding a precise amount of lost motion whereby the lost motion of said first and second transmission means may be made equal.

6. In a transmission system wherein at least first and second driven members are controlled according to a drive member, a drive member, a first driven member, a second driven member, a first gear train operably connecting said drive member and said driven member having a determinable amount of lost motion therein, a second gear train operably connecting said drive member and said second driven member having a determinable amount of lost motion therein less than the amount of lost motion in said first gear train, and adjustable lost motion means connected between said drive member and said second driven member for adding lost motion whereby the total lost motion of each of said first and second gear trains may be made equal for synchronizing said driven members.

References Cited in the file of this patent

UNITED STATES PATENTS

| | | |
|---|---|---|
| 2,099,359 | Woodeson et al. | Nov. 16, 1937 |
| 2,292,533 | Maltman | Aug. 11, 1942 |
| 2,640,338 | Charvat | June 2, 1953 |
| 2,656,178 | Hughes | Oct. 20, 1953 |